July 13, 1965 H. RUDOLPH 3,195,107
SECURED TRANSMISSION OF CODED BINARY SYMBOLS
Filed Jan. 24, 1961
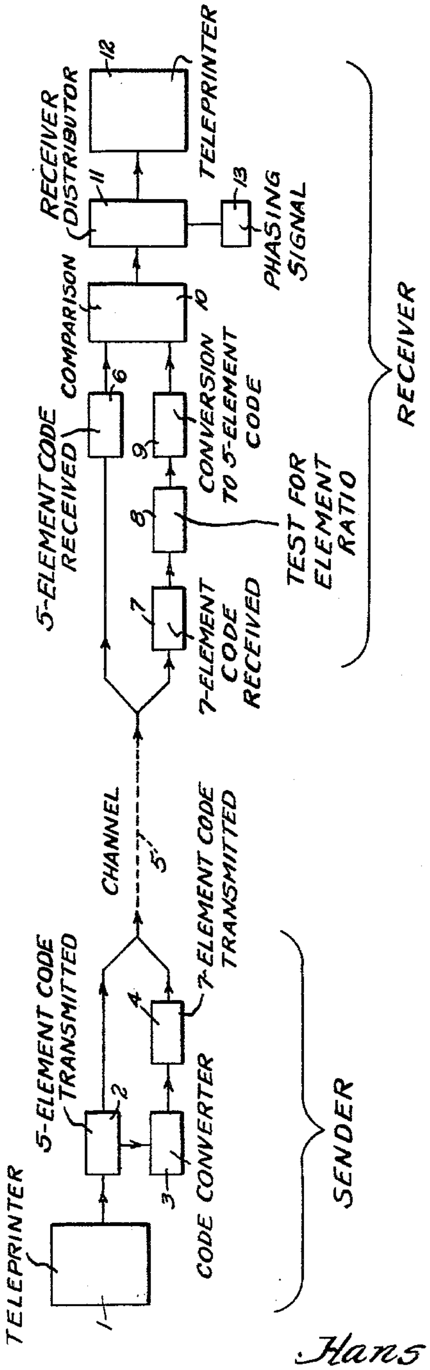
Inventor:
Hans Rudolph.
By [signature] Atty.

United States Patent Office 3,195,107
Patented July 13, 1965

3,195,107

SECURED TRANSMISSION OF CODED BINARY SYMBOLS

Hans Rudolph, Munich-Solln, Germany, assignor to Siemens & Halske Aktiengesellschaft, Berlin and Munich, a corporation of Germany Filed Jan. 24, 1961, Ser. No. 84,591
1 Claim. (Cl. 340—146.1)

This invention relates to a system for the secured transmission of binary coded symbols and is particularly concerned with a system for transmitting symbols over communication channels including wire as well as wireless channels.

It is in the transmission of symbols, for example, teleprinter symbols impossible to prevent with sufficient certainty disturbance of a symbol coded in binary code, resulting in falsification of one or more elements of the symbol. This causes, in connection with the customary teleprinter code, already upon falsification of one element, appearance at the receiver, of an element differing from the element transmitted by the sender. It is however for many purposes, for example, in the transmission of numerical values, as from one to another banking institution, necessary that the falsification of an individual symbol be recognized with certainty so as to avoid erroneous recording and consequently erroneous evalution and booking.

Symbols of messages to be transmitted are customarily coded according to the 5-element teleprinter code. It is however, also known to code the symbols by employing the so-called 7-element code and to select from the 128 possibilities to be formed thereby merely those in which the ratio of elements of one kind to the elements of the other kind (ratio of space current elements to mark current elements) is 3 to 4. The consequence of coding symbols employing the 7-element code is, that one-sided disturbances, that is, disturbances which falsify the elements of a given kind into elements of the other kind, are with certainty recognized. However, this code fails in the case of two-sided errors, that is, transposition errors, since an element of one kind, belonging to a symbol, can be falsified into an element of the other kind and vice versa, thus resulting in an erroneous symbol which nevertheless satisfies the code requirements.

The present invention is concerned with a transmission system wherein transmission errors can be recognized with very great probability, thereby avoiding with certainty the evaluation of a falsified symbol. It is easily possible to prove that the possibility of an unobjectionable error recognition grows theoretically with the number of elements allocated to a symbol. A secured transmission of symbols presupposes for this reason a greater number of elements within an individual symbol. The conversion of individual symbols into a plural element code requires considerable expenditure with regard to switching members, if it is desired to build up completely new symbols. It has therefore been proposed to add to the five elements of the teleprinter alphabet a plurality of control elements. The addition of five or seven elements will however likewise result in considerable expenditure at the sender as well as at the receiver. The symbols which are to be transmitted are however at the terminal apparatus at any rate required in a customary code, for example, the 5-element code.

The transmission system according to the present invention assures with simple means, and particularly with the use of known devices, a transmission which substantially guarantees the desired high security. According to the invention, each individual symbol is transmitted at least twice, that is, initially once in a customary code which preferably lacks error indication, and preferably directly thereafter in an error-indicating code, for example, the 7-element code, or vice versa, first in the error-indicating code and thereafter in the customary code. The receiver is provided with test devices which check the code requirements of the securing code, for example, the 7-element code and carry out a comparison of the evaluated and decoded symbols. Further evaluation, for example, the printing of the symbols is effected only and solely after the testing devices have ascertained an unobjectionable reception.

Accordingly, in the transmission system disclosed herein, the transmission of each individual symbol requires a total of twelve elements which are composed of the elements of the 7-element code and the elements of the 5-element code.

Customary circuit arrangements can be used for building up the symbols according to the invention, since it is merely necessary to convert into 7-element symbols the 5-element symbols coming from the teleprinter machine. Well known and commonly used code converters can be directly employed for this purpose. The transmission is thereupon effected by first scanning and transmitting the 5-element symbol and preferably directly thereafter scanning and transmitting the seven elements of the 7-element symbol, or vice versa.

The elements taken from the 7-element code at the receiver are for the error control tested for the proper element ratio (3 to 4) and are thereupon conducted to a code converter so as to effect conversion into a 5-element symbol, and the individual elements of the latter are then compared with those of the five elements of the received 12-element code symbol which are taken from the 5-element code.

Symbols which are disturbed one-sided are by this double control fully recognized while symbols which are disturbed two-sided or mixed are with great probability recognized as being disturbed.

Systems employing known automatic error correction with repetition of disturbed symbols responsive to automatic check-back or recall, are always constructed as synchronous systems, and the conditions, prolonged space and prolonged mark position, occurring in normal teleprinter operation with unsecured 5-element start-stop code, are likewise transmitted with the aid of element combinations of the securing code, that is, until now, the 7-element code. Moreover, the check-back or recall signal is in the case of self-correcting systems transmitted as a secured code combination. Accordingly, a securing code must make available at least three combinations more than are required for the message transmission over lines which are operated with the 5-element start-stop code.

Since this condition is fulfilled by the 7-element code with its 35 combinations but is of course not fulfilled by the 5-element code with its 32 combinations, there are in the proposed 12-element code no combinations of the 5-element code corresponding to the three special combinations of the 7-element code, which are designated by $\alpha$ for the prolonged mark condition, by $\beta$ for the prolonged space condition and by RQ for the recall signal.

It is therefore proposed, in accordance with another feature of the invention, to allocate, for the formation of the 12-element code groups of the three special combinations, to the 7-element combinations thereof those of the 5-element combinations which normally belong to the combinations of the 7-element code, which are—with the exception of an element of the kind which is contained four times in the 7-element code symbol—a mirror image of the corresponding special combination in the 7-element code.

Of all the falsification possibilities of the 7-element code, the one on which six elements will produce an accurate mirror image, will have the least probability. An example of the construction of the 12-element combination of the three special symbols will now be given, its being assumed thereby that the polarization of the first element which is in all 7-element combinations to be considered a mark element, remains unaltered. In the following example, 0=mark element and 1=space element.

Signal $\alpha$ in 7-element code: 0101001; with the last six elements mirror image, there will appear: 0010110, that is, the letter X with the element sequence in 5-element code: 10111. Accordingly, 0101001 and 10111 are combined as a 12-element code for $\alpha$.

Signal $\beta$ in 7-element code: 0101100; with the last six elements in mirror image, there will appear: 0010011, that is, the letter F with the element sequence in 5-element code: 10110. Accordingly, 0101100 and 10110 are combined as a 12-element combination for $\beta$.

Signal RQ in 7-element code: 0110100; with the last six steps in mirror image, there will appear: 0001011, that is, the letter K with the element sequence in 5-element code: 11110. Accordingly, 0110100 and 11110 are combined as a 12-element combination for RQ.

The combining of two independent, basically wholly different codes, to a new code with correspondingly increased index, results in a further advantage. Continuous reception of erroneous symbols despite good transmission conditions will generally indicate that the receiver distributor is not operating in correct phase with respect to the received code symbol. The receiver distributor can then be manually or automatically adjusted element by element until 12-element code symbols are obtained with matching 7-element and 5-element portions thereof. The correct meeting of correlated 7-element and 5-element portions therefor is an indication for the correct phasing of the receiver distributor. A signal released in such case will indicate that further adjustment of the receiver distributor is to be stopped and the signal can therefore be employed for the semiautomatic or fully automatic phasing.

An embodiment of the invention is schematically indicated in the accompanying drawing.

Referring now to the drawing, numeral 1 indicates a teleprinter machine from which are transmitted, in known and customary manner, teleprinter symbols in a 5-element code. The symbols coming from the teleprinter machine in the 5-element code are in customary manner extended over the sender distributor 2 to the transmission channel and parallel to the code-converter 3, which is disposed in parallel with the sender distributor 2, in which the symbols are in known and customary manner converted into the so-called 7-element teleprinter symbols, the 7-element code symbols being thereupon transmitted over the sender distributor 4. The transmission can be effected in any desired known manner, for example, in series operation over lines or over a wireless channel, indicated by numeral 5.

The total of twelve transmitted elements are in the receiver distributed respectively to the 5-element receiver part 6 and to the 7-element receiver part 7. Serially connected with the latter is a so-called code test device 8 which ascertains whether or not the 7-element symbol satisfies the elements ratio, that is, the 3 to 4 code requirement (3 elements of one polarity and 4 elements of another polarity). The symbol which is in this manner checked is in the code converter 9 reconverted into a 5-element symbol of the same significance which is conducted to the comparison device 10, for comparison with the 5-element symbol which is likewise conducted from the receiver part 6 to the comparison device 10. Assuming a series mode of operation, the 5-element symbol from the receiver part 6, will appear at the comparison device 10 directly ahead of or after the appearance of the 5-element symbol from the conversion device 9. However, since the code test device and the conversion can be operated purely electrically, there is no distortion in point of time, so that the corrected symbol together with the 5-element symbol which has been transmitted unchanged, can be present and directly compared therewith in the comparison device 10. Comparison devices such as the device 10 are in accordance with all rules equipped with storage members and the comparison can therefore be effected in the device 10 as required.

Upon ascertaining symbol identity in the comparison device 10, the phasing device 13 will release a signal to the receiver distributor 11, indicating that the symbols are correctly phased, and the respective symbol is conducted to the receiver distributor 11 and from there to the receiver teleprinter machine 12 which effects printing of the symbol or provides in known manner a perforated record thereof, whereby the symbol is rendered useful for the receiving operation related thereto.

An error indication is released only upon ascertaining, in the code testing device 8 or in the comparison device 10, a discrepancy respectively with regard to the code requirement or with regard to the identity of the converted 7-element symbol with the directly transmitted 5-element symbol.

Changes may be made within the scope and spirit of the appended claim which defines what is believed to be new and desired to have protected by Letters Patent.

I claim:

A transmission system for the secured transmission from a sender of binary coded teleprinter symbols to a receiver, comprising means for transmitting each symbol at least twice, namely, first in customary and preferably not error indicated multiple element teleprinter code, and second in an error indicating multiple element code containing a different number of elements than said first-mentioned code, converting means operatively related to said first means for effecting conversion of the symbol to such second code, a receiver for receiving the transmitted symbols, and testing means in the receiver for checking the symbols as to the presence of code requirements, namely, the absence of an error indication in said second-mentioned error indicating code, and identity of the transmitted symbol in both codes.

References Cited by the Examiner

UNITED STATES PATENTS

| | | | |
|---|---|---|---|
| 2,512,038 | 6/50 | Potts | 178—23 |
| 2,640,872 | 6/53 | Hartley | 178—23 |

MALCOLM A. MORRISON, *Primary Examiner.*

NEWTON N. LOVEWELL, *Examiner.*